United States Patent [19]

Madry

[11] 4,360,704
[45] Nov. 23, 1982

[54] MOISTURE PROOF ELECTRICAL CABLE

[75] Inventor: Peter Madry, Barsinghausen, Fed. Rep. of Germany

[73] Assignee: Kabel-und Metallwerke Gutehoffnungshütte AG, Hanover, Fed. Rep. of Germany

[21] Appl. No.: 217,622

[22] Filed: Dec. 18, 1980

Related U.S. Application Data

[63] Continuation of Ser. No. 13,819, Feb. 22, 1979, abandoned.

[30] Foreign Application Priority Data

Feb. 23, 1978 [DE] Fed. Rep. of Germany ....... 2807767

[51] Int. Cl.³ .............................................. H01B 7/22
[52] U.S. Cl. .................... 174/36; 174/23 R; 174/102 SC; 174/107; 174/120 SC
[58] Field of Search ............. 174/22 R, 23 R, 105 SC, 174/106 SC, 107, 108, 120 C, 120 SC, 36

[56] References Cited

U.S. PATENT DOCUMENTS

| | | | |
|---|---|---|---|
| 3,564,110 | 2/1971 | Biskeborn | 174/102 R X |
| 3,607,487 | 9/1971 | Biskeborn | 174/23 R |
| 3,692,925 | 9/1972 | Kindij | 174/102 SC |
| 3,733,225 | 5/1973 | Moody | 174/23 R X |
| 3,767,454 | 10/1973 | Franke | 174/23 R |
| 3,885,085 | 5/1975 | Bahder | 174/120 SC X |
| 3,943,271 | 3/1976 | Bahder | 174/102 SC X |
| 4,020,276 | 4/1977 | Maingueneau | 174/107 X |
| 4,095,039 | 6/1978 | Thompson | 174/102 D X |
| 4,197,423 | 4/1980 | Fusen | 174/120 SC X |

FOREIGN PATENT DOCUMENTS 2514891 4/1975 Fed. Rep. of Germany ...... 174/107

*Primary Examiner*—R. R. Kucia
*Attorney, Agent, or Firm*—Ralf H. Siegemund

[57] ABSTRACT

An insulated cable core is provided with a shield made of individual wires which are embedded in a first plastically deformable jacket which carries a water vapor impermeable sleeve made of wrapped or folded metal or metallized foil or ribbon whose adjoining edges are sealed. This sleeve carries a second plastically deformable jacket to be embedded in-between two such jackets. The usual protective covering is provided around the outer deformable jacket.

7 Claims, 1 Drawing Figure

U.S. Patent  Nov. 23, 1982  4,360,704
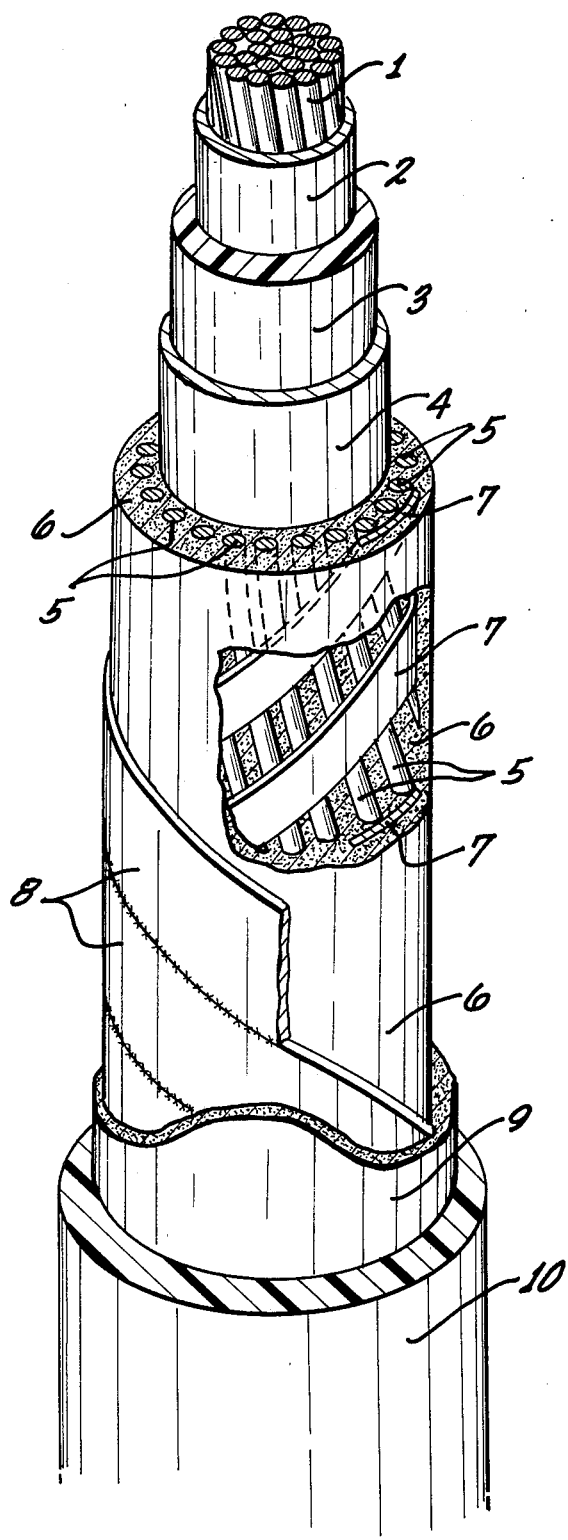

MOISTURE PROOF ELECTRICAL CABLE

This is a continuation, of application Ser. No. 13,819, filed Feb. 22, 1979 now abandoned.

BACKGROUND OF THE INVENTION

The present invention relates to moisture proofing electrical, medium or high voltage cable.

A known variety of electrical cable for medium or high voltages consists of a cable core, an insulating jacket surrounding the core, an electrically conductive coating on the jacket and a shield on the coating, the shield consisting, for example, of wires which have been stranded onto the core-jacket-coating sub-assembly and are held thereon by suitable ribbons. Subsequently, the assembly is completed by extruding an outer protective jacket onto the shield.

Occasionally, the outer jacket is damaged so that moisture may penetrate into the cable. Moisture may seep through any gaps between the shield wires, the ribbons etc. and sooner or later corrosion starts to set in. Also, moisture which has penetrated into the interior of the cable degrades the insulation, and so-called water treeing will sooner or later cause insulation failure and voltage breakdown.

The corrosion mentioned above is usually the result of the formation of electrolytic elements. The shield wires are made of copper or aluminum, and the electrically conductive coating on which the wires sit, contains graphite. Thus, moisture will act as electrolyte for these two electrochemically different parts. The electro-corrosion will destroy the shield or at least damage it locally.

Ingress of moisture will also lead to damage to terminating fittings and connection sleeves of the cable. It can readily be seen further that the various problems outlined above will be particularly pronounced in underwater cable. The cable is subjected to the rather high hydrostatic pressure, forcing water into any leak.

German printed patent application No. 25 14 891 suggests embedding the shield wires in a conductive coating. Corrosion can be avoided to some extent in that manner. This coating serves also as a barrier against further penetration of moisture into the insulation underneath. However, submarine cable as well as underground high voltage cable are not sufficiently protected in that manner.

In the case of underwater cable, the water pressure may well suffice to cause water to penetrate the barrier. A high voltage underground cable has usually thick insulation but sets up also very high local electrical field strength. Moreover, the polymer insulation has a rather high thermal coefficient of expansion. Thus, a thick insulation jacket will expand and contract, also called breathing, so that the shield experiences a rather strong mechanical load, and gaps, cavities or pockets may readily form in the interior of the cable.

Generally speaking, it is also known that the types of plastic used for making cable jackets are not completely impervious in regard to diffusion of moisture. Thus, one has jacketed such cables, particularly in critical cases, in a lead cover or by longitudinally folding an overlapping metal foil around the cable upon which a polymer jacket is extruded. Such a construction provides adequate protection of an undamaged cable under normal operating conditions. However, after the jacket has been damaged, moisture may well migrate into the cable, in axial direction, and do the various kind of damage outlined earlier.

DESCRIPTION OF THE INVENTION

It is an object of the present invention to provide a new and improved electrical cable which is to be made moisture proof.

It is another object of the present invention to provide a new and improved electrical submarine cable.

It is a further object of the present invention to provide a new and improved electrical cable for underground installation.

It is a specific object of the present invention to improve high and medium voltage type cable in which a shield made of elongated metallic elements such as strips or wires, is provided on top of the insulation surrounding the cable core.

In accordance with the preferred embodiment of the present invention, the cable as per the specific object is improved by embedding the individual elements of the shield into a plastically deformable casting constituting a first sealing jacket; a water vapor impermeable sleeve has been formed onto the first jacket and is covered by a second plastically deformable sealing jacket so that the sleeve is, in fact, concentrically embedded by and in-between the two jackets. Embedding this impermeable barrier in these plastically deformable jackets enhances the mechanical strength of the moisture barrier for the shield, and the embedded sleeve prevents ingress and spreading of water into the insulation. An outer conductive layer and/or the first (inner) jacket may include carbon, but due to the embedding in plastically deformable material, moisture filled pockets will not appear adjacent to the shield wires which are made from copper or aluminum, so that electro corrosion is avoided. The embedding material will take up some of the heat thay may develop in the case of a short circuit, so that short circuit strength of the shield is increased. Rendering the jacket underneath the sleeve conductive is of advantage on this point and increases generally the conductivity of the shield.

The sleeve is made from metal foil or metallized plastic foil or of such ribbons wrapped or folded onto the jacket embedding the shield wires, and adjoining edges of such foil or ribbon are welded, soldered or bonded together to seal the resulting tubular configuration so as to obtain the vapor impermeable sleeve.

The plastic jackets are preferably made of polyisobutylene or methacrylicacidester with bitumen or chalk added as filler; carbon black or graphite is preferably used as additive for providing electrical conductivity. One may also use atactic polybutene, stearic acid or wax-like polyolefine. Decisive is that the material is plastically deformable.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE shows a cable in accordance with the preferred embodiment of the invention.

Proceeding to the detailed description of the drawings, the Figure shows a cable core 1 made of stranded aluminum or copper wires. However, the core could be of solid construction. For large cross-sections a stranded configuration is preferred because of its greater flexibility. An electrically conductive cover or coating 2 is extruded onto the core.

The coated core is covered by an insulating jacket 3, made, for example, of crosslinked or regular polyethylene which has been sprayed on or extruded. The jacket 3, in turn, is covered by an outer conductive coating 4. This coating may also be extruded or a graphite layer may be deposited on jacket 3 upon which one wraps electrically conductive plastic foils or ribbons. Still alternatively or additionally, one may use electrically conductive crepe paper to serve additionally as a cushion. If the conductive layer or coating 4 has been extruded, it should be bonded or welded to the insulation underneath.

The next layer of the cable is established by wires 5 or thin strips, ribbons, etc., which are helically wound or stranded on layer 4 in a meander pattern. The wires are embedded in a jacket 6. The embedding material fills particularly all gaps between the wires. In order to provide or to increase the electrical cross-conduction between the wires, a conductive ribbon 7 may be helically wrapped onto the wires 5. The ribbon will become embedded in the jacket 6.

The jacket 6 itself may also be electrically conductive, but in the case of using a metal ribbon 7 such conductivity is not mandatory. The jacket 6 is preferably made of a plastically deformable material such as a compound on the basis of polyisobutylene or a methacrylicacidester. Either of these materials may be supplemented by a filler such as chalk or otherwise to enhance plasticity. If the jacket is to be electrically conductive, one should use as additional or as alternative filler carbon black or graphite. The jacket 6 can also be made of atactic polybutene stearic acid or of a wax-like polyolefine. However, the materials mentioned earlier are preferred.

By way of example, one may use about 40% (by weight) methacrylicacidester or a like percentage of polyisobutylene to which are added 25% (by weight) bitumen and 5% natural or synthetic wax, possibly supplemented by other fillers such as chalks. The remainder will or may be carbon black or graphite. The latter component provides for the electrical conductivity if desired. Generally speaking, the content of carbon black or graphite should not exceed 50% (by weight). On the other hand, in order to have any significant conductivity, if desired, one should use at least 5% (by weight) graphite or carbon black.

The thus embedded shield 5,6 is covered by a sleeve 8 made, for example, by helically wrapping a copper ribbon onto coating 6. Alternatively, a broad copper ribbon or foil may have been longitudinally folded about the jacket 6. In other words, the tubular sleeve may have resulted and made from a helically wrapped ribbon or from a longitudinally folded ribbon. The ribbon used here may have a polymer coating for ease of handling, particularly to prevent the copper ribbon material from tearing or be damaged otherwise upon wrapping or folding it onto the sub-assembly 1-2-3-4-6. It is well possible to use a polymer base ribbon which is metallized, i.e. metal (copper) is coated on one or even on both sides.

The edges of the ribbon as wrapped (coiled) or folded longitudinally should overlap and be bonded or otherwise mechanically interconnected such as by soldering or welding. The joint and bond so made must seal the resulting sleeve; this is particularly critical if the cable is expected to be subjected to high pressure. This sleeve 8 is the water vapor impermeable barrier that surrounds the embedded shield. The sleeve 8 is covered by another plastic jacket 9 in the sense that sleeve 8 is actually embedded in between the two plastically deformable jackets, 6 and 9. The jacket 9 may well be made of the same material as jacket 6. This is particularly true with regard to plasticity of the embedment of sleeve 8 which should be at least approximately the same on the inside and on the outside of this water vapor barrier 8. It may, however, be of advantage to add a plasticizer to jacket 9. This is particularly true if the jacket above 10 is also made of a material that contains a plasticizer, for example, in the case of a polyvinylchloride jacket 10.

It should be noted that a plasticizer should not be added to the jacket 6, because such plasticizer may migrate (diffuse) into the outer layer 4, even into insulation 3 and may swell; also such plasticizer may cause stress corrosion cracking of the insulation. On the other hand, the inner jacket 6 may include voltage stabilizing additives such as aromatic oils. If jacket 6 is electrically conductive, these additives will not affect the properties of the jacket. However, sooner or later these additives may diffuse through layer 4 into the insulation 3. This indirect application of voltage stabilizing additives has the advantage that they do not have to be included in the insulation or to a lesser extent and will thus not impede the extrusion of the insulation 3 onto the cable core.

As far as the layer or outer jacket 10 is concerned, it serves primarily as outer protective cover, and polyvinylchloride is indeed preferred. Generally speaking however, this outer jacket 10 is not a plastically deformable envelope; at least any plasticity is of significantly lesser degree than the plasticity of the jacket 9. Plasticity of the latter and of the jacket 6 as understood here is given by the example according to which about one fourth of these jackets 6 and 9 should be, for example, a bituminus substance or up to half of the jacket should consist of graphite or carbon black. Whatever the host material, these additives render the respective layers 6 and 9 significantly plastically deformable.

In the case of submarine use, one has to armor the cable additionally by additional protective covers as is conventional in this field of art.

The cable is preferably made in the following manner. Beginning with the core 1, the inner conductive layer 2, the insulation jacket 3, and the outer conductive layer 4, are provided in sequence in the usual manner such as extrusion and/or spray coating, whereby however, the layer 4 preferably results from wrapping a ribbon as described.

Next, the wires 5 are stranded onto the sub-assembly 1-2-3-4 and the plastic material is cast, i.e. caused to flow around the wires to establish the jacket 6. The material is rendered sufficiently fluid by heating, but upon cooling it retains sufficient viscosity to qualify as plastically deformable. Immediately prior thereto the ribbon 7 may have been wrapped around the wires. The sleeve 8 is formed or wrapped onto or around the jacket, just a little downstream from the casting process for jacket 6, and just a little further downstream, the jacket 9 is cast onto the sleeve. This way the sleeve 8 is formed and embedded in jackets 6 and 9 in one continuous process.

As stated above, one uses metal foil or ribbon with a backing of a polymer type material or one uses such base tape that is metallized on one or both sides. The foil or ribbon is coiled wrapped or folded into a tube around and onto jacket 6, and the adjoining edges of the ribbon or foil are sealingly interconnected by welding, bonding, soldering or the like. The result here is a water vapor impermeable sleeve.

The material for jackets 6 and 9 has preferably be heated to 120° C. to 135° C. to obtain sufficient fluidity. Excess material should be stripped off the jacket 6 before the sleeve 8 is formed and the same is true as far as excess material during the casting of jacket 9 is concerned. Thereafter the jacket 10, 13, e.g. extruded onto jacket 9.

It can readily be seen that the resulting cable is moisture proof indeed. The cable is strong as far as longitudinal tension or stress loads in any direction are concerned. In case of local damage to the cover 10, moisture will not penetrate far into the cable in any direction but will be stopped by water vapor impermeable sleeve 8. Condensation of any diffused moisture will not occur in-between the wires of the shield so that any corrosion producing elements are not formed by the copper and the carbon or graphite containering parts. "Breathing" as outlined above will not form pockets adjacent to the shield wires 8 on account of the plasticity of the embedment.

If for any reason a short circuit occurs so that the current flow increases drastically, some of the heat developed by that short circuit current is conducted into the jackets 6 and 9 so that the short circuit load the shield can take is increased indeed. Moreover, a carbon or graphite content of the jacket or jackets 6 and 9 increases the effective cross-section for such current flow thus reducing the short circuit current density.

I claim:

1. Electrical cable for medium and high voltages, and including a conductor core with insulating jacket covered by an electrically conductive layer, further comprising:
   a shield made of metallic, elongated elements such as ribbons or wires on the said layer;
   a first plastically deformable jacket on the layer and sealingly embedding said ribbons or wires of said shield;
   a water-vapor-impermeable sleeve on the first jacket and being comprised of a helically coiled metal or metallized ribbon having adjoining edges sealingly interconnected, the sleeve being sealed by the first jacket;
   a second, plastically deformable, water-proofing jacket on the sleeve and sealing the sleeve from its outside, the sleeve being sealingly embedded by and in between the first and second jackets; and
   protective cover means on the second jacket.

2. Cable as in claim 1, at least one of the first and second jackets being electrically conductive.

3. Cable as in claim 1, said plastic jackets including at least one of the following: a bituminous substance, chalk, carbon black, and graphite.

4. Cable as in claim 1, 2 or 3, said first and second jackets including methacrylicacidester.

5. Cable as in claim 1, the second jacket including a plasticizer.

6. Cable as in claim 1, 2, or 3, said first and second jackets including polyisobutylene.

7. Cable as in claim 1 or 5, the first jacket including voltage-stabilizing additives.

* * * * *